United States Patent
Cheng et al.

(10) Patent No.: US 10,977,739 B2
(45) Date of Patent: Apr. 13, 2021

(54) RISK IDENTIFICATION MODEL BUILDING AND RISK IDENTIFICATION

(71) Applicant: Advanced New Technologies Co., Ltd., Grand Cayman (KY)

(72) Inventors: Yu Cheng, Hangzhou (CN); Qing Lu, Hangzhou (CN); Xinyi Fu, Hangzhou (CN); Tao Chen, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

(21) Appl. No.: 16/805,141

(22) Filed: Feb. 28, 2020

(65) Prior Publication Data

US 2020/0202449 A1     Jun. 25, 2020

Related U.S. Application Data

(63) Continuation of application No. PCT/CN2018/100989, filed on Aug. 17, 2018.

(30) Foreign Application Priority Data

Nov. 10, 2017    (CN) .......................... 201711106115.9

(51) Int. Cl.
    *H04L 29/06*      (2006.01)
    *G06N 99/00*      (2019.01)
    (Continued)

(52) U.S. Cl.
    CPC ........... *G06Q 40/08* (2013.01); *G06F 16/215* (2019.01); *G06N 3/0427* (2013.01); *G06N 3/08* (2013.01)

(58) Field of Classification Search
    CPC .... G06Q 40/08; G06F 16/215; G06N 3/0427; G06N 3/08
(Continued)

(56) References Cited

U.S. PATENT DOCUMENTS 9,516,053 B1    12/2016   Muddu et al.
9,531,736 B1 *   12/2016   Torres ................. H04L 63/1441
(Continued)

FOREIGN PATENT DOCUMENTS

CN     104778176     7/2015
CN     105740707     7/2016
(Continued)

OTHER PUBLICATIONS

International Preliminary Report on Patentability in PCT Appn No. PCT/CN2018/100989, dated May 12, 2020, 10 pages (with English translation).

(Continued)

*Primary Examiner* — Brandon S Cole
(74) *Attorney, Agent, or Firm* — Fish & Richardson P.C.

(57) ABSTRACT

One or more implementations of the present specification provide a risk identification model building method, and a risk identification method. From data of a target user, user state records of the target user within a predetermined duration of time are extracted, wherein the user state records include a plurality of user operations and/or a plurality of system events. The user state records are sorted based on corresponding occurrence times. A user state sequence is generated based on sorted user state records. The generated user state sequence is converted into a sequence feature. A risk identification result is generated based on a previously trained risk identification model that takes as input the sequence feature generated from the user state sequence.

20 Claims, 5 Drawing Sheets

(51) Int. Cl.
*G06Q 40/08* (2012.01)
*G06F 16/21* (2019.01)
*G06F 16/215* (2019.01)
*G06N 3/04* (2006.01)
*G06N 3/08* (2006.01)

(58) Field of Classification Search
USPC ........................................................ 706/1–62
See application file for complete search history.

(56) References Cited

U.S. PATENT DOCUMENTS

| | | | |
|---|---|---|---|
| 2010/0094768 | A1 | 4/2010 | Miltonberger |
| 2011/0131122 | A1 | 6/2011 | Griffin et al. |
| 2014/0201126 | A1 | 7/2014 | Zadeh et al. |
| 2015/0186901 | A1 | 7/2015 | Miltonberger |
| 2017/0012770 | A1 | 1/2017 | Lin et al. |
| 2017/0169360 | A1* | 6/2017 | Veeramachaneni ......................... G06N 3/0454 |
| 2017/0270534 | A1 | 9/2017 | Zoldi et al. |
| 2018/0063168 | A1* | 3/2018 | Sofka ................... H04L 63/1416 |
| 2019/0020671 | A1* | 1/2019 | Komarek ............... G06N 20/00 |

FOREIGN PATENT DOCUMENTS

| | | |
|---|---|---|
| CN | 106650273 | 5/2017 |
| CN | 106845999 | 6/2017 |
| CN | 107067283 | 8/2017 |
| CN | 107316198 | 11/2017 |
| CN | 107886243 | 4/2018 |
| TW | 201025177 | 7/2010 |
| TW | I573036 | 3/2017 |
| WO | WO 2015037499 | 3/2015 |

OTHER PUBLICATIONS

Crosby et al., "BlockChain Technology: Beyond Bitcoin," Sutardja Center for Entrepreneurship & Technology Technical Report, Oct. 16, 2015, 35 pages.
International Search Report and Written Opinion in PCT Appln. No. PCT/CN2018/100989, dated Nov. 15, 2018, 9 pages.
Nakamoto, "Bitcoin: A Peer-to-Peer Electronic Cash System," www.bitcoin.org, 2005, 9 pages.
Extended European Search Report in European Appln No. 18876802.2, dated Jul. 10, 2020, 9 pages.
Anonymous, "Artificial neural network" Nov. 2, 2017, retrieved on Jul. 23, 2020, retrieved from URL<https://en.wikipedia.org/w/index.php?title=artificial_neural_network&oldid=808432886>, 44 pages.

* cited by examiner

RISK IDENTIFICATION MODEL BUILDING AND RISK IDENTIFICATION

CROSS-REFERENCE TO RELATED APPLICATIONS

This application is a continuation of PCT Application No. PCT/CN2018/100989, filed on Aug. 17, 2018, which claims priority to Chinese Patent Application No. 201711106115.9, filed on Nov. 10, 2017, and each application is hereby incorporated by reference in its entirety.

TECHNICAL FIELD

The present specification relates to the field of data mining technologies, and in particular, to a risk identification model building method, apparatus, and device and a risk identification method, apparatus, and device.

BACKGROUND

In the era of big data, data mining and machine learning technologies are gradually applied to various fields to alleviate practical problems. For example, a model is built based on a large amount of real user data or event data, to predict various unknown situations of new users or new events.

For example, in a risk control scenario of financial industry, by analyzing users participating in risk events with known labels, potential relationships between various user features and risk events can be discovered to form a relationship model between user features and risks, that is, "what kind of user or user behavior is more likely to cause a risk event" is predicted, so that various measures are taken in advance to avoid or reduce occurrence of risk events.

SUMMARY

To alleviate the previous technical problem, implementations of the present specification provide a risk identification model building method, apparatus, and device and a risk identification method, apparatus, and device. Technical solutions are as follows:

According to a first aspect of the implementations of the present specification, a risk identification model building method is provided, and includes: extracting user state records from data of a given user within predetermined duration before a specific event occurs, where the user state records include user operation behavior and/or system events, and the specific event is an event whose risk type is determined; sorting the extracted user state records based on occurrence time, and generating a user state sequence for the specific event based on a sorting result; converting the generated user state sequence into a sequence feature; and building risk identification sample data by using the obtained sequence feature as a feature value and the risk type of the event as a label value, and building a risk identification model by using at least one piece of sample data.

According to a second aspect of the implementations of the present specification, a risk identification method is provided, and includes: extracting user state records of a target user within given duration from data of the target user, where the user state records include user operation behavior and/or system events; sorting the user state records based on occurrence time, and generating a user state sequence based on a sorting result; converting the generated user state sequence into a sequence feature; and outputting a risk identification result by using the sequence feature as input of a pre-built risk identification model.

According to a third aspect of the implementations of the present specification, a risk identification model building apparatus is provided, and includes: an extraction unit, configured to extract user state records from data of a given user within predetermined duration before a specific event occurs, where the user state records include user operation behavior and/or system events, and the specific event is an event whose risk type is determined; a sequence generation unit, configured to sort the extracted user state records based on occurrence time, and generate a user state sequence for the specific event based on a sorting result; a feature conversion unit, configured to convert the generated user state sequence into a sequence feature; and a model building unit, configured to build risk identification sample data by using the obtained sequence feature as a feature value and the risk type of the event as a label value, and build a risk identification model by using at least one piece of sample data.

According to a fourth aspect of the implementations of the present specification, a risk identification apparatus is provided, and includes: an acquisition unit, configured to extract user state records of a target user within given duration from data of the target user, where the user state records include user operation behavior and/or system events; a sequence generation unit, configured to sort the user state records based on occurrence time, and generate a user state sequence based on a sorting result; a feature conversion unit, configured to convert the generated user state sequence into a sequence feature; and an output unit, configured to output a risk identification result by using the sequence feature as input of a pre-built risk identification model.

According to a fifth aspect of the implementations of the present specification, a computer device is provided, and includes: a processor; and a memory, configured to store a processor executable instruction, where the processor is configured to: extract user state records from data of a given user within predetermined duration before a specific event occurs, where the user state records include user operation behavior and/or system events, and the specific event is an event whose risk type is determined; sort the extracted user state records based on occurrence time, and generate a user state sequence for the specific event based on a sorting result; convert the generated user state sequence into a sequence feature; and build risk identification sample data by using the obtained sequence feature as a feature value and using the risk type of the event as a label value, and build a risk identification model by using at least one piece of sample data.

According to a sixth aspect of the implementations of the present specification, a computer device is provided, and includes: a processor; and a memory, configured to store a processor executable instruction, where the processor is configured to: extract user state records of a target user within given duration from data of the target user, where the user state records include user operation behavior and/or system events; sort the user state records based on occurrence time, and generate a user state sequence based on a sorting result; convert the generated user state sequence into a sequence feature; and output a risk identification result by using the sequence feature as input of a pre-built risk identification model.

The technical solutions provided in some implementations of the present specification achieve the following effects:

Potential relationships between user state sequences and risk events are discovered to build a risk identification model. In a risk identification stage, risks of a specific event performed by a user to be identified or risks of the user to be identified can be predicted based on the risk identification model and an extracted user state sequence of the user to be identified, which improves a risk identification capability of a risk control system.

It should be understood that the previous general descriptions and the following detailed descriptions are merely illustrative and explanatory and cannot limit the implementations of the present specification.

Furthermore, any one of the implementations of the present specification does not need to achieve all the effects described above.

BRIEF DESCRIPTION OF DRAWINGS

To describe technical solutions in implementations of the present specification or in the existing technology more clearly, the following briefly describes the accompanying drawings needed for describing the implementations or the existing technology. Apparently, the accompanying drawings in the following descriptions merely show some implementations recorded in the present specification, and a person of ordinary skill in the art can still derive other drawings from these accompanying drawings.

DESCRIPTION OF IMPLEMENTATIONS

To make a person skilled in the art better understand the technical solutions in the implementations of the present specification, the following describes the technical solutions in the implementations of the present specification in detail with reference to the accompanying drawings in the implementations of the present specification. Apparently, the described implementations are merely some rather than all of the implementations of the present specification. All other implementations obtained by a person of ordinary skill in the art based on the implementations of the present specification shall fall within the protection scope.

To implement risk identification, a large quantity of events with known labels can be used as samples, to obtain a mapping relationship of "user feature-risk score" through training. Common user features can be classified into two types: static features and behavior features. In the financial field, risk-related static features can include asset information, authentication information, social relationship information, etc. of a user, and behavior features can include various behavior of the user on the platform, such as a click operation, a browse operation, a transfer operation, and an access operation.

The behavior features are often more suitable for risk prediction than the static features. For example, it may be uneasy to effectively distinguish between a common user and a fraudster based on static features. However, because the fraudster often performs some preparations before a fraudulent behavior, operations that are often performed by the fraudster before the fraudulent behavior, quantities of the operations, frequency of the operations, etc. can all describe and express a motive of the fraudster to a certain extent.

Furthermore, in addition to behavior events (namely, operations that a user has performed), behavior features of a user can include time information associated with these events. For example, behavior sequences of two users within the past one hour are as follows:

User 1: A→B→C→D
User 2: B→C→A→D

It can be seen that although the two sequences include the same behavior events, two different behavior patterns are formed due to different occurrence sequences. In practice, two different behavior patterns may cause totally different subsequent results. Therefore, with continuous upgrading of attack and defense between embezzlement and anti-embezzlement, a new demand is imposed on an ability to depict embezzlement behavior features. During risk prediction, time features of user behavior can be incorporated into training of a risk prediction model to further improve risk control effects.

Figure 1:
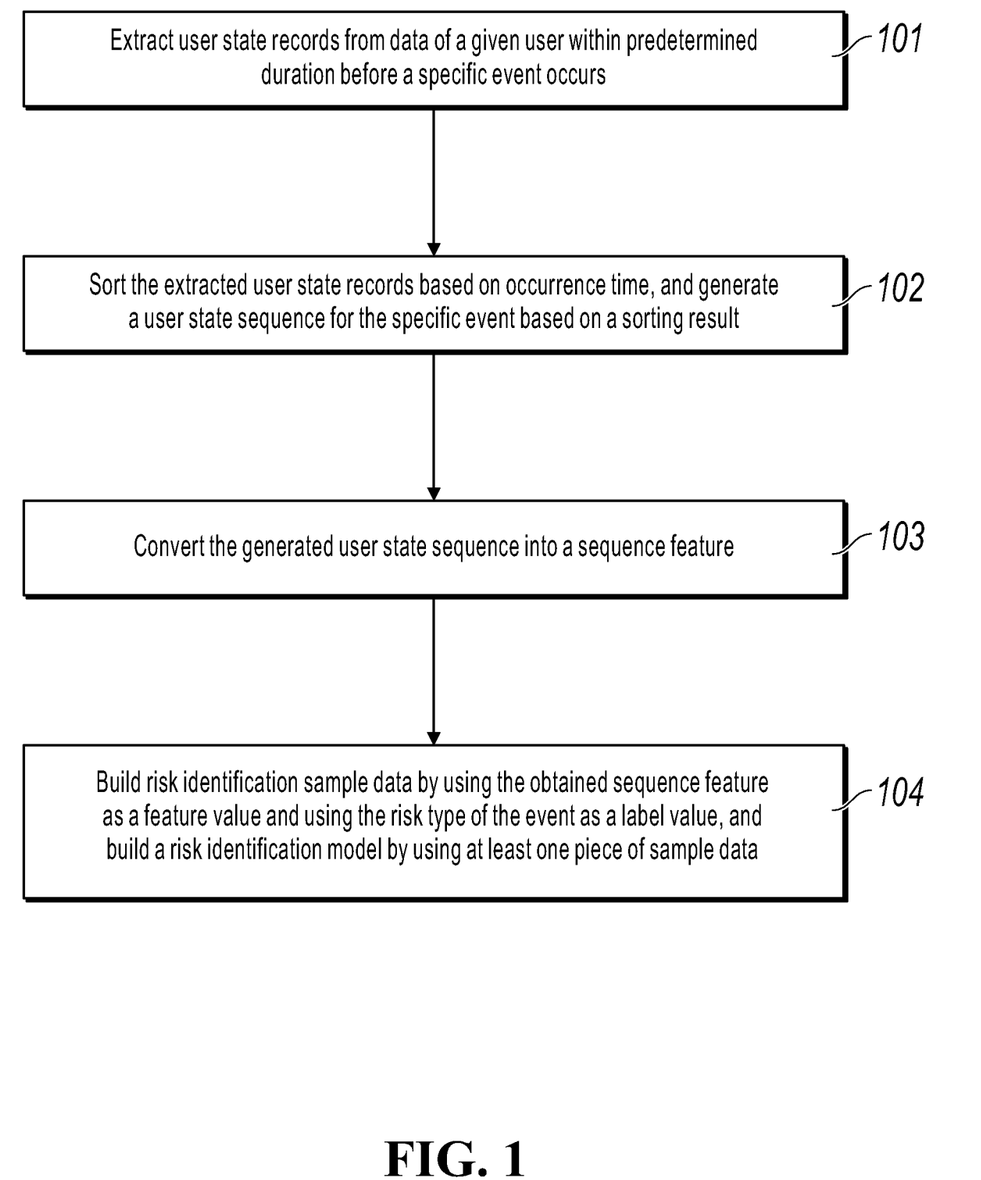
FIG. 1 is a schematic flowchart illustrating a risk identification model building method, according to an implementation of the present specification.

In view of the previous descriptions, the implementations of the present specification provide a risk identification solution. The solution includes two stages: a risk identification model building stage and a stage of using a risk identification model for risk identification. First, the risk identification model building stage is introduced. As shown in FIG. 1, a risk identification model building method can include the following steps 101 to 104.

Step 101: Extract user state records from data of a given user within predetermined duration before a specific event occurs.

Model building is a machine learning process performed based on sample data, and therefore sample data collection is the first step. The "given user" is a sample user. A larger quantity of samples usually indicates a better effect of a built model. Generally, sample user selection can be performed based on specific events performed by users. The specific event can be an event whose risk type is determined. For example, for a transfer that has already occurred, a type of the transfer event can be determined as "high risk" if it is subsequently determined that the transfer is performed by an embezzler; or the type of the transfer event can be determined as "low risk" if it is subsequently determined that the transfer is performed by a user.

In a business operation process, historical data of each user can be collected (stored in a database) or can rely on online data collection. The data can include static data and dynamic data. After a large quantity of samples are selected, for each sample, user state records within predetermined duration (for example, one hour) before a specific event occurs can be extracted from data corresponding to the sample. The user state records include user operation behavior (such as a click operation, a browse operation, a transfer operation, and an access operation) and/or system events. The system events can include an event that is caused by a user behavior and an event that is not caused by a user behavior. That is, the user state records reflect behavior performed by the user within a period of time and/or system events occurred in this period of time, and further records moment of each user behavior and/or system event.

Step 102: Sort the extracted user state records based on occurrence time, and generate a user state sequence for the specific event based on a sorting result.

For example, for user 1, extracted user state records include four states (namely, behavior or system events): A, B, C, and D. Because occurrence time of each state is recorded, a result of sorting the four states based on a time sequence is for example as follows:

B→A→C→D

Actually, it may not be reasonable enough to directly use the sorting result as a final user state sequence. For example, for user 1 and user 2, sorting results may be exactly the same, but the two users have different intervals between any two adjacent states. In practice, different intervals between states may reflect totally different user motives. For example, a significant feature of an embezzler is that an interval between two states B and A is relatively short, but a significant feature of a common user is that an interval between the two states B and A is relatively long.

Considering the previous case, in an implementation, a process of generating the user state sequence can be specifically as follows:

In the sorting result, based on an interval between the $i(i≥1)$th user state and the $(i+1)$th user state, the ith user state is converted into a user state that includes information about the interval.

Still in the previous example, assume i=1, the first user state is B and the second user state is A. If an interval between the two user states B and A is t1, a result obtained after the conversion is for example as follows:

B(t1)→A→C→D

By analogy, A and C in the sequence can be converted in the same way.

For another example, time intervals can be classified into two types: "long" and "short" (which can be classified based on a determined duration threshold). In this case, a result obtained after conversion is for example as follows:

B (long)→A (short)→C (long)→D

According to another aspect, to enable the finally generated user state sequence to better express a motive of the user, a process of generating the user state sequence can be specifically as follows:

In the sorting result, based on a pre-obtained evaluation result of the ith user state, the ith user state is converted into a user state that includes information about the evaluation result.

Any user state can be evaluated and an obtained evaluation result is used to reflect if the user state is good or bad. For example, if the evaluation result is a score between 0 and 1, a higher score indicates a lower probability to cause a fraudulent event. Actually, a large quantity of user state records that include a specific user state can be collected for evaluation. For example, 100 records that include user state A are collected, and actually, 10 of the 100 records finally cause a fraudulent event. Therefore, an evaluation result of user state A can be 0.9.

Still in the previous example, a final user state sequence obtained after conversion can be for example as follows:

B (0.3)→A (0.9)→C (0.6)→D (0.99)

For another example, user state evaluation results can be classified into two types: "high risk" and "low risk". In this case, a result obtained after conversion is for example as follows:

B (low risk)→A (high risk)→C (low risk)→D (high risk)

It is found in a practical application process that some user states (for example, a state that the user clicks on a pushed advertisement) has no practical significance for risk identification, and therefore does not need to be reflected in the user state sequence. In view of this, a process of generating the user state sequence can be specifically as follows:

User states in the sorting result are filtered based on predetermined filtering rules. The filtering rules at least define user states that should be filtered out.

Still in the previous example, for the sorting result: B→A→C→D, if it is determined, based on the filtering rules, that C is a state that should be filtered out, a finally obtained user state sequence is B→A→D.

Certainly, feasible sequence conversion methods are not limited to the examples listed above, and are not listed one by one in the present specification.

Step 103: Convert the generated user state sequence into a sequence feature.

An objective of step 103 is to express the user state sequence by using mathematical features, to form the sequence feature that can be identified.

In an implementation, step 103 specifically includes: encoding the generated user state sequence as a sequence vector. Further, the encoding the generated user state sequence as a sequence vector can include the following steps:

Step 131: Encode each state in the user state sequence as a state vector based on a first encoding rule (for example, word2vector). For example, for B→A→C→D, B is encoded as 000101.

Step 132: Encode a sequence consisting of state vectors into a sequence vector by using a neural network. The neural network includes but is not limited to a recurrent neural network (RNN) and a convolutional neural network (CNN). Actually, multiple state vectors are input into the neural network, to use a vector finally output by the neural network as a sequence vector.

In another implementation, the method can further include step 10 and step 20.

Step 10: Mine a frequent sequence item set from multiple user state sequences.

The frequent sequence item set is a set consisting of frequent sequence items, and the frequent sequence item is a sequence that occurs relatively frequent. On one hand, User state sequences can be collected, occurrence times of each user state sequence can be counted, and finally the user state sequences are sorted in descending order based on the occurrence times, so that a certain quantity of top-ranked user state sequences can be selected as frequent sequence items. Alternatively, the same sequence can be mined from multiple user state sequences as a frequent sequence item. For example:

User state sequence 1: A→B→D→F→C→E
User state sequence 2: A→B→F→C
User state sequence 3: A→B→D→C→E In this case, a frequent sequence item finally mined from the three user state sequences is as follows:

A→B→C

Step 20: For each frequent sequence item in the frequent sequence item set, determine a feature value corresponding to the frequent sequence item based on a black and white sample distribution status corresponding to the frequent sequence item.

For example, for the frequent sequence item "A→B→C", 100 samples including the sequence are selected (it is determined that a certain sample includes a certain sequence when the sequence occurs in the sample within given duration), where each sample can be determined as a white sample (namely, a sample with no risk event occurred) or a black sample (namely, a sample with a risk event occurred)

based on whether the sample finally causes a risk event (for example, embezzlement). For example, if the 100 samples include 90 black samples and 10 white samples, it can be determined that a risk probability (namely, the probability to cause a risk event) corresponding to the frequent sequence item "A→B→C"=0.9.

In the present specification, a feature value corresponding to a frequent sequence item can be determined based on a risk probability corresponding to the frequent sequence item. For example, the risk probability corresponding to the frequent sequence item "A→B→C" is determined as a feature value of the frequent sequence item. Alternatively, for any frequent sequence item, a feature value can be obtained by using the softmax function. The essence of the softmax function is to compress (map) any K-dimensional real vector into another K-dimensional real vector, where a value of each element in the vector can fall within (0, 1), and the softmax function is used to alleviate the multi-type problem.

Correspondingly, step 103 can include the following step 133 and step 134.

Step 133: Determine, based on the frequent sequence item set, a frequent sequence item included in the generated user state sequence.

Step 134: Determine the sequence feature corresponding to the user state sequence based on the frequent sequence item included in the user state sequence and the predetermined feature value corresponding to each frequent sequence item.

For example, assume that a generated user state sequence is as follows:

A→B→D→F→C→E

Based on the previously mined frequent sequence item set, frequent sequence items included in the user state sequence (which is, previously mined frequent sequence items that the user state sequence includes) are determined as follows:

A→B→D and D→F→C

Assume that a feature value corresponding to A→B→D is x1 and a feature value corresponding to D→F→C is x2, a sequence feature corresponding to the user state sequence A→B→D→F→C→E can be finally calculated based on the feature values x1 and x2 of the frequent sequence items included in the user state sequence. For example, a sum of the feature values of the frequent sequence items included in the user state sequence is calculated, and the sum is used as the sequence feature.

Step 104: Build risk identification sample data by using the obtained sequence feature as a feature value and using the risk type of the event as a label value, and build a risk identification model by using at least one piece of sample data.

The feature value is input of the model to be trained, and the label value (for example, a label value corresponding to "high risk" is 1 and a label value corresponding to "low risk" is 0) can be used as expected output of the model. Certainly, in an actual model training process, in addition to the sequence feature, other feature variables, such as conventional model variables that are not sequence, can be introduced. All variables are jointly used for model training and online risk identification.

Figure 2:
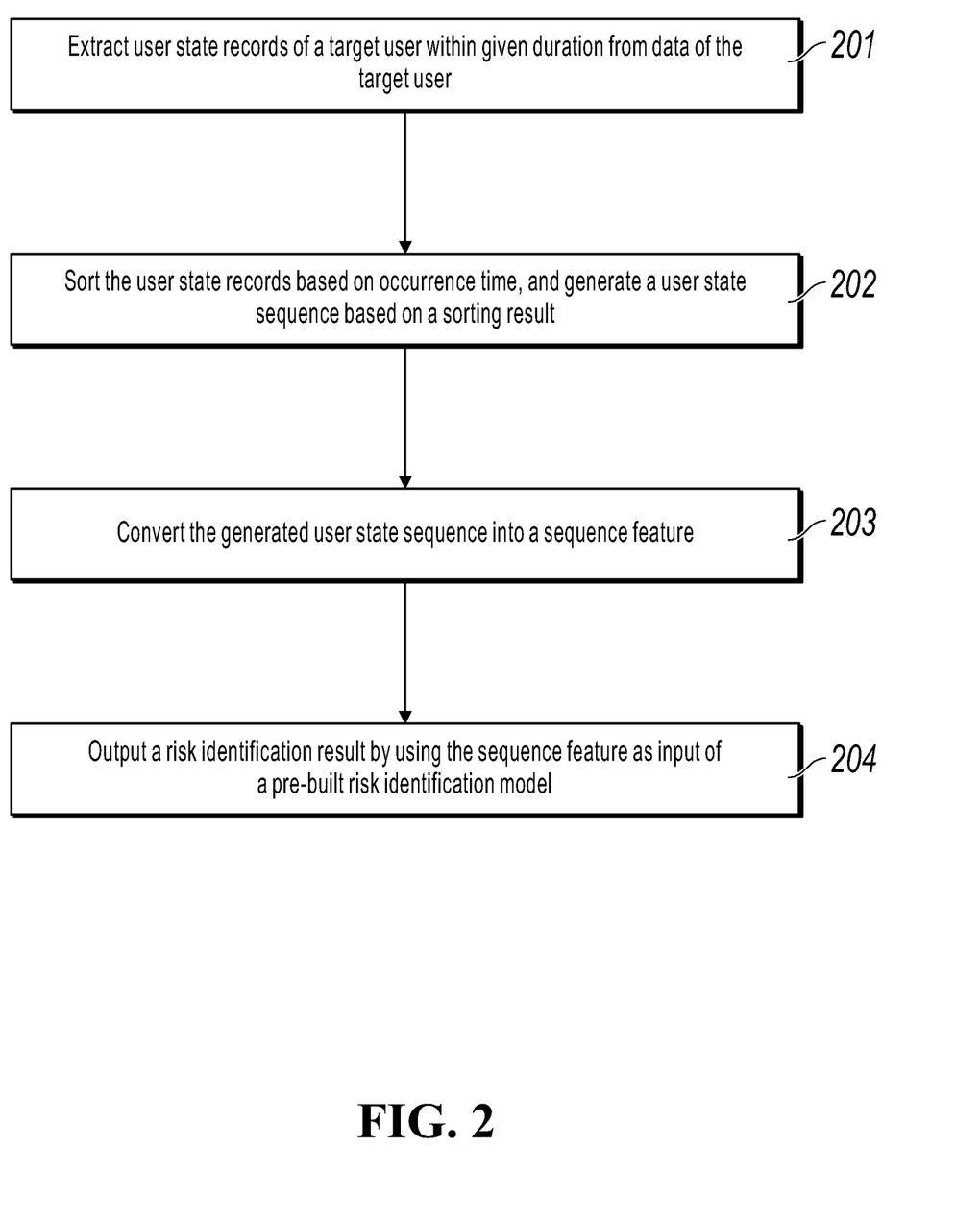
FIG. 2 is a schematic flowchart illustrating a risk identification method, according to an implementation of the present specification.

As shown in FIG. 2, based on the model built above, a risk identification method can include step 201 to step 204.

Step 201: Extract user state records of a target user within given duration from data of the target user, where the user state records include user operation behavior and/or system events.

About when to extract the user state records in step 201, the following cases are included:

Case 1: When it is identified that the target user is about to perform a specific event (for example, a transfer), the user state records of the target user within the given duration before the specific event occurs start to be extracted. If a risk is finally identified, a corresponding measure is taken, for example, the transfer is disallowed.

Case 2: After the target user performs a specific event, the user state records of the target user within the given duration before the specific event occurs start to be extracted. If a risk is finally identified, an account used by a fraudster can be frozen.

Step 202: Sort the user state records based on occurrence time, and generate a user state sequence based on a sorting result.

Step 203: Convert the generated user state sequence into a sequence feature.

Step 204: Output a risk identification result by using the sequence feature as input of a pre-built risk identification model. The output of the model can represent the probability that the current specific event has risks.

The method provided in the implementations of the present specification achieves the following effects:

Potential relationships between user state sequences and risk events are discovered to build a risk identification model. In a risk identification stage, risks of a specific event performed by a user to be identified or risks of the user to be identified can be predicted based on the risk identification model and an extracted user state sequence of the user to be identified, which improves a risk identification capability of a risk control system, and improves defense robustness of the risk control system, so that it's more difficult for an embezzler to bypass a policy and the model. In addition, behavior sequence information can intuitively reflect a crime commission method of an embezzler, and can assist a policy analyst to easily analyze embezzlement behavior more conveniently, thereby improving working efficiency.

Corresponding to the previous method implementations, the implementations of the present specification further provide a risk identification model building apparatus and a risk identification apparatus.

Figure 3:
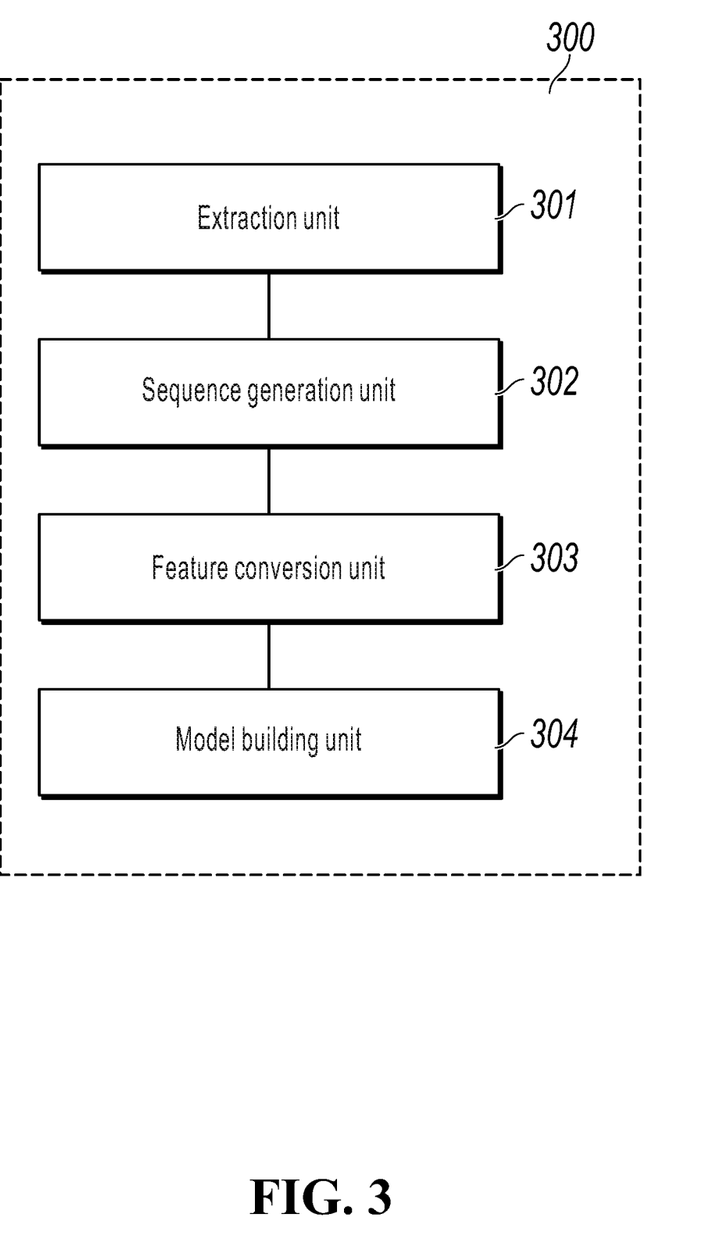
FIG. 3 is a schematic structural diagram illustrating a risk identification model building apparatus, according to an implementation of the present specification.

As shown in FIG. 3, risk identification model building apparatus 300 can include: extraction unit 301, configured to extract user state records from data of a given user within predetermined duration before a specific event occurs, where the user state records include user operation behavior and/or system events, and the specific event is an event whose risk type is determined; sequence generation unit 302, configured to sort the extracted user state records based on occurrence time, and generate a user state sequence for the specific event based on a sorting result; feature conversion unit 303, configured to convert the generated user state sequence into a sequence feature; and model building unit 304, configured to build risk identification sample data by using the obtained sequence feature as a feature value and using the risk type of the event as a label value, and build a risk identification model by using at least one piece of sample data.

In an implementation, sequence generation unit 302 can be configured to: in the sorting result, convert, based on an interval between the ith user state and the (i+1)th user state, the ith user state into a user state that includes information about the interval.

In an implementation, sequence generation unit 302 can be configured to: in the sorting result, convert, based on a pre-obtained evaluation result of the ith user state, the ith user state into a user state that includes information about the evaluation result.

In an implementation, sequence generation unit 302 can be configured to: filter user states in the sorting result based on predetermined filtering rules.

Figure 4:
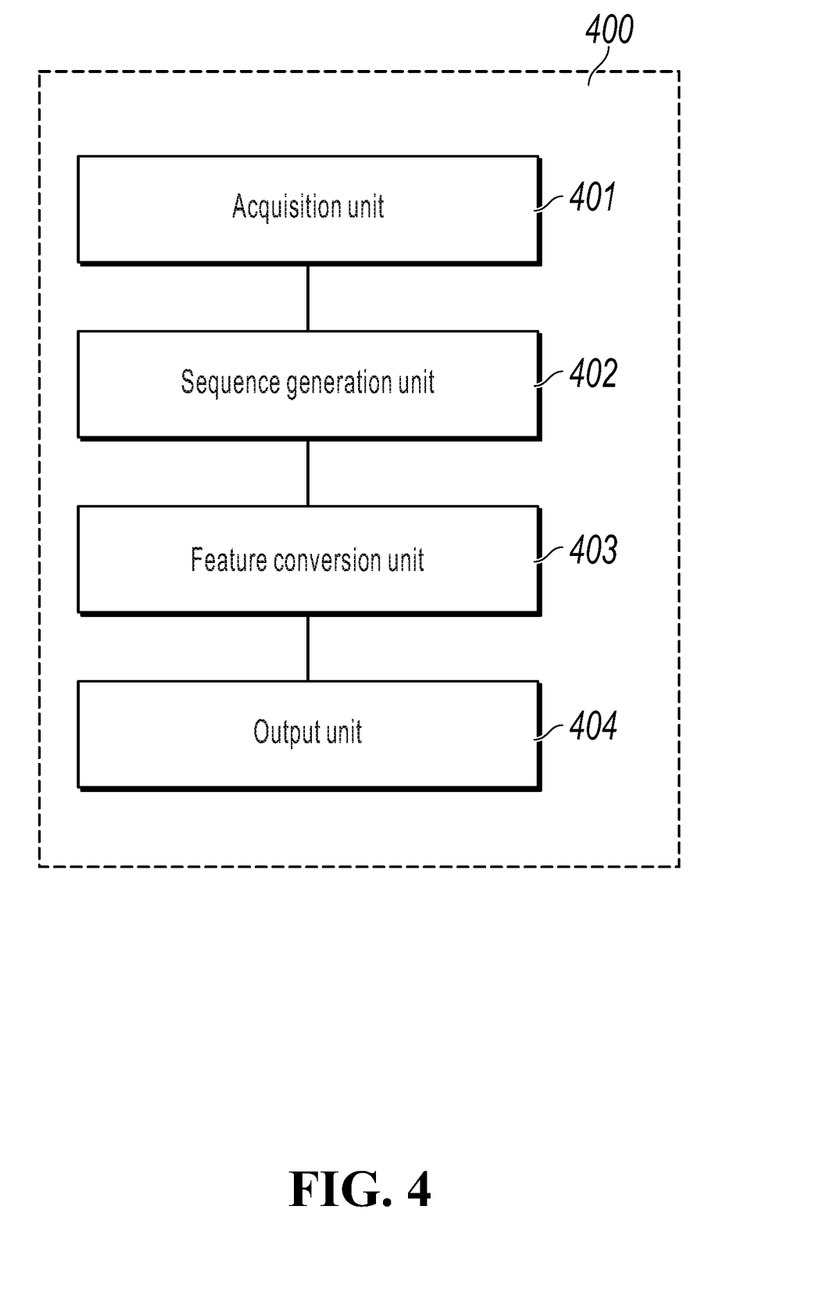
FIG. 4 is a schematic structural diagram illustrating a risk identification apparatus, according to an implementation of the present specification.

As shown in FIG. 4, risk identification apparatus 400 can include: acquisition unit 401, configured to extract user state records of a target user within given duration from data of the target user, where the user state records include user operation behavior and/or system events; sequence generation unit 402, configured to sort the user state records based on occurrence time, and generate a user state sequence based on a sorting result; feature conversion unit 403, configured to convert the generated user state sequence into a sequence feature; and output unit 404, configured to output a risk identification result by using the sequence feature as input of a pre-built risk identification model.

In an implementation, sequence generation unit 402 can be configured to: in the sorting result, convert, based on an interval between the ith user state and the (i+1)th user state, the ith user state into a user state that includes information about the interval.

In an implementation, sequence generation unit 402 can be configured to: in the sorting result, convert, based on a pre-obtained evaluation result of the ith user state, the ith user state into a user state that includes information about the evaluation result.

In an implementation, sequence generation unit 402 can be configured to: filter user states in the sorting result based on predetermined filtering rules.

For a specific implementation process of a function of each module in the apparatus, references can be made to an implementation process of a corresponding step in the previous method. Details are omitted here.

The implementations of the present specification further provide a computer device. The computer device includes at least a memory, a processor, and a computer program that is stored in the memory and that can run on the processor. The processor implements the previous risk identification method when executing the program. In an implementation, the method includes at least the following steps: extracting user state records from data of a given user within predetermined duration before a specific event occurs, where the user state records include user operation behavior and/or system events, and the specific event is an event whose risk type is determined; sorting the extracted user state records based on occurrence time, and generating a user state sequence for the specific event based on a sorting result; converting the generated user state sequence into a sequence feature; and building risk identification sample data by using the obtained sequence feature as a feature value and using the risk type of the event as a label value, and building a risk identification model by using at least one piece of sample data.

In another implementation, the method includes at least the following steps: extracting user state records of a target user within given duration from data of the target user, where the user state records include user operation behavior and/or system events; sorting the user state records based on occurrence time, and generating a user state sequence based on a sorting result; converting the generated user state sequence into a sequence feature; and outputting a risk identification result by using the sequence feature as input of a pre-built risk identification model.

Figure 5:
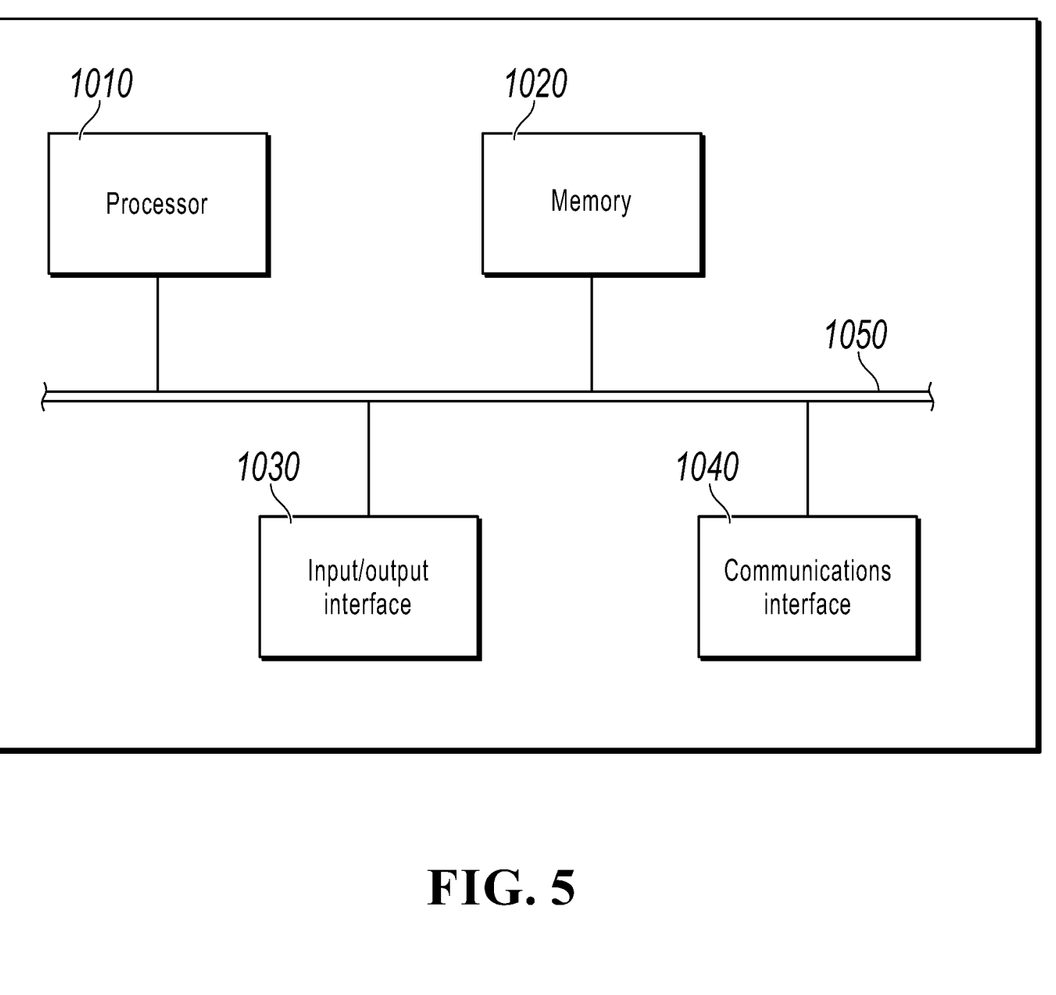
FIG. 5 is a schematic structural diagram of a device for configuring a device according to an embodiment of the present specification.

FIG. 5 is a schematic diagram illustrating a more specific hardware structure of a computing device, according to an implementation of the present specification. The device can include processor 1010, memory 1020, input/output interface 1030, communications interface 1040, and bus 1050. Processor 1010, memory 1020, input/output interface 1030, and communications interface 1040 implement communication connections among each other inside the device through bus 1050.

Processor 1010 can be implemented by using a general-purpose central processing unit (CPU), a microprocessor, an application-specific integrated circuit (ASIC), one or more integrated circuits, etc. and is configured to execute a related program to implement the technical solutions provided in some implementations of the present specification.

Memory 1020 can be implemented in forms of a read-only memory (ROM), a random access memory (RAM), a static storage device, a dynamic storage device, etc. Memory 1020 can store operating systems and other application programs. When the technical solutions provided in the implementations of the present specification are implemented by using software or firmware, related program code is stored in memory 1020 and is invoked and executed by processor 1010.

Input/output interface 1030 is configured to be connected to input/output modules to input and output information. The input/output modules can be included in the device as a component (not shown in the figure), or can be externally connected to the device, to provide corresponding functions. The input device can include a keyboard, a mouse, a touchscreen, a microphone, various sensors, etc. The output device can include a display, a loudspeaker, an oscillator, an indicator, etc.

Communications interface 1040 is configured to be connected to communications modules (not shown in the figure) to implement communication interaction between the device and other devices. The communications modules can implement communication in a wired way (for example, by using a USB or a network cable) or in a wireless way (for example, by using a mobile network, WIFI, or Bluetooth).

Bus 1050 includes a communication path for transmitting information between components (for example, processor 1010, memory 1020, input/output interface 1030, and communications interface 1040) in the device.

It is worthwhile to note that, although only processor 1010, memory 1020, input/output interface 1030, communications interface 1040, and bus 1050 in the device are shown, in a specific implementation process, the device can further include other components necessary for implementing normal operations. In addition, a person skilled in the art can understand that the device can include only components necessary for implementing the solutions in the implementations of the present specification, but does not necessarily include all the components shown in the figures.

It can be learned from the previous descriptions of the implementations that, a person skilled in the art can clearly understand that the implementations of the present specification can be implemented by using software and a necessary general hardware platform. Based on such an understanding, the technical solutions in the implementations of the present specification essentially or parts that contribute to the existing technology can be implemented in a form of software products. The computer software product can be stored in a storage medium, such as a ROM/RAM, a magnetic disk, or an optical disc, and includes several instructions for instructing a computer device (which can be a personal computer, a server, a network device, etc.) to perform the methods described in the implementations of the present specification or in some parts of the implementations.

The system, apparatus, module, or unit illustrated in the previous implementations can be specifically implemented by using a computer chip or an entity, or can be implemented by using a product having a certain function. A typical implementation device is a computer, and a specific form of the computer can be a personal computer, a laptop computer, a cellular phone, a camera phone, a smartphone, a personal digital assistant, a media player, a navigation device, an email sending/receiving device, a game console, a tablet computer, a wearable device, or any combination of these devices.

The implementations in the present specification are described in a progressive way. For same or similar parts of the implementations, mutual references can be made to the implementations. Each implementation focuses on a difference from other implementations. Particularly, an apparatus implementation is basically similar to a method implementation, and therefore is described relatively briefly. For a related part, references can be made to some descriptions in the method implementation. The previously described apparatus implementations are merely examples. The modules described as separate parts may or may not be physically separate. During implementation of the solutions in the implementations of the present specification, functions of the modules can be implemented in one or more pieces of software and/or hardware. Alternatively, some or all of the modules can be selected based on an actual demand to implement the solutions of the implementations. A person of ordinary skill in the art can understand and implement the implementations of the present specification without creative efforts.

The previous descriptions are merely specific implementations of the implementations of the present specification. It is worthwhile to note that a person of ordinary skill in the art can further make improvements or polishing without departing from the principle of the implementations of the present specification, and the improvements or polishing shall fall within the protection scope of the implementations of the present specification.

What is claimed is:

1. A computer-implemented method, comprising:
   extracting, from data of a target user, user state records of the target user within a predetermined duration of time, wherein the user state records comprise a plurality of user operations and/or a plurality of system events;
   sorting the user state records based on corresponding occurrence times;
   generating a user state sequence based on sorted user state records;
   mining a frequent sequence item set from multiple user state sequences;
   for each frequent sequence item in the frequent sequence item set, determining a feature value corresponding to the frequent sequence item;
   converting the generated user state sequence into a sequence feature comprising:
      determining, based on the frequent sequence item set, one or more frequent sequence items occurring in the generated user state sequence; and
      determining the sequence feature corresponding to the generated user state sequence based on combining one or more feature values corresponding to the one or more frequent sequence items occurring in the generated user state sequence; and
   generating a risk identification result based on a previously trained risk identification model that takes as input the sequence feature generated from the user state sequence.

2. The computer-implemented method of claim 1, wherein the generating a user state sequence based on the sorted user state records comprises:
   in the sorted user state records, adding, based on an interval between the ith user state record and the (i+1)th user state record, information about the interval to the ith user state record.

3. The computer-implemented method of claim 1, wherein the generating a user state sequence based on the sorted user state records comprises:
   in the sorted user state records, adding, based on a previously-obtained evaluation result of the ith user state record, information about the evaluation result to the ith user state record.

4. The computer-implemented method of claim 1, wherein the generating a user state sequence based on the sorted user state records comprises:
   removing one or more user states records from the sorted user state records based on predetermined filtering rules.

5. The computer-implemented method of claim 1, wherein the previously trained risk identification model is trained using user state records from data of a given user within the predetermined duration of time before a specific event occurs, and the specific event is an event whose risk type is determined.

6. The computer-implemented method of claim 1, wherein converting the generated user state sequence into the sequence feature comprises:
   encoding the generated user state sequence into a sequence vector.

7. The computer-implemented method of claim 6, wherein the encoding the generated user state sequence into the sequence vector comprises:
   encoding each state in the user state sequence as a state vector based on a first encoding rule; and
   using a neural network, encoding a sequence that comprises the state vectors into the sequence vector.

8. The computer-implemented method of claim 6, further comprising:
   for each frequent sequence item in the frequent sequence item set, determining the feature value corresponding to the frequent sequence item based on a black and white sample distribution status corresponding to the frequent sequence item.

9. A non-transitory, computer-readable medium storing one or more instructions executable by a computer system to perform operations comprising:
   extracting, from data of a target user, user state records of the target user within a predetermined duration of time, wherein the user state records comprise a plurality of user operations and/or a plurality of system events;
   sorting the user state records based on corresponding occurrence times;
   generating a user state sequence based on sorted user state records;
   mining a frequent sequence item set from multiple user state sequences;
   for each frequent sequence item in the frequent sequence item set, determining a feature value corresponding to the frequent sequence item;
   converting the generated user state sequence into a sequence feature comprising:

determining, based on the frequent sequence item set, one or more frequent sequence items occurring in the generated user state sequence; and determining the sequence feature corresponding to the generated user state sequence based on combining one or more feature values corresponding to the one or more frequent sequence item occurring in the generated user state sequence; and generating a risk identification result based on a previously trained risk identification model that takes as input the sequence feature generated from the user state sequence.

10. The non-transitory, computer-readable medium of claim 9, wherein the generating a user state sequence based on the sorted user state records comprises:

in the sorted user state records, adding, based on an interval between the ith user state record and the (i+1)th user state record, information about the interval to the ith user state record.

11. The non-transitory, computer-readable medium of claim 9, wherein the generating a user state sequence based on the sorted user state records comprises:

in the sorted user state records, adding, based on a previously-obtained evaluation result of the ith user state record, information about the evaluation result to the ith user state record.

12. The non-transitory, computer-readable medium of claim 9, wherein the generating a user state sequence based on the sorted user state records comprises:

removing one or more user states records from the sorted user state records based on predetermined filtering rules.

13. The non-transitory, computer-readable medium of claim 9, wherein the previously trained risk identification model is trained using user state records from data of a given user within the predetermined duration of time before a specific event occurs, and the specific event is an event whose risk type is determined.

14. The non-transitory, computer-readable medium of claim 9, wherein converting the generated user state sequence into the sequence feature comprises:

encoding the generated user state sequence into a sequence vector.

15. The non-transitory, computer-readable medium of claim 14, wherein the encoding the generated user state sequence into the sequence vector comprises:

encoding each state in the user state sequence as a state vector based on a first encoding rule; and using a neural network, encoding a sequence that comprises the state vectors into the sequence vector.

16. The non-transitory, computer-readable medium of claim 14, wherein the operations further comprise:

for each frequent sequence item in the frequent sequence item set, determining the feature value corresponding to the frequent sequence item based on a black and white sample distribution status corresponding to the frequent sequence item.

17. A computer-implemented system, comprising:
one or more computers; and
one or more computer memory devices interoperably coupled with the one or more computers and having tangible, non-transitory, machine-readable media storing one or more instructions that, when executed by the one or more computers, perform one or more operations comprising:

extracting, from data of a target user, user state records of the target user within a predetermined duration of time, wherein the user state records comprise a plurality of user operations and/or a plurality of system events;

sorting the user state records based on corresponding occurrence times;

generating a user state sequence based on sorted user state records;

mining a frequent sequence item set from multiple user state sequences;

for each frequent sequence item in the frequent sequence item set, determining a feature value corresponding to the frequent sequence item;

converting the generated user state sequence into a sequence feature comprising:

determining, based on the frequent sequence item set, one or more frequent sequence items occurring in the generated user state sequence; and determining the sequence feature corresponding to the generated user state sequence based on combining one or more feature values corresponding to the one or more frequent sequence item occurring in the generated user state sequence; and generating a risk identification result based on a previously trained risk identification model that takes as input the sequence feature generated from the user state sequence.

18. The computer-implemented system of claim 17, wherein converting the generated user state sequence into the sequence feature comprises:

encoding the generated user state sequence into a sequence vector.

19. The computer-implemented system of claim 18, wherein the encoding the generated user state sequence into the sequence vector comprises:

encoding each state in the user state sequence as a state vector based on a first encoding rule; and using a neural network, encoding a sequence that comprises the state vectors into the sequence vector.

20. The computer-implemented system of claim 18, wherein the operations further comprise:

for each frequent sequence item in the frequent sequence item set, determining the feature value corresponding to the frequent sequence item based on a black and white sample distribution status corresponding to the frequent sequence item; and.

\* \* \* \* \*

UNITED STATES PATENT AND TRADEMARK OFFICE
CERTIFICATE OF CORRECTION

PATENT NO. : 10,977,739 B2
APPLICATION NO. : 16/805141
DATED : April 13, 2021
INVENTOR(S) : Yu Cheng et al.

Page 1 of 1

It is certified that error appears in the above-identified patent and that said Letters Patent is hereby corrected as shown below:

In the Claims

Column 14, Line 56, in Claim 20, delete "item; and." and insert -- item. --, therefor.

Signed and Sealed this
Twenty-second Day of June, 2021

Drew Hirshfeld
*Performing the Functions and Duties of the*
*Under Secretary of Commerce for Intellectual Property and*
*Director of the United States Patent and Trademark Office*